(12) United States Patent
Masatsugu et al.

(10) Patent No.: US 9,908,450 B2
(45) Date of Patent: Mar. 6, 2018

(54) LIFTING CONTAINER HOLDER

(71) Applicant: TOYODA GOSEI CO., LTD., Kiyosu-shi, Aichi-ken (JP)

(72) Inventors: Yoshinori Masatsugu, Kiyosu (JP); Shinichi Sawada, Kiyosu (JP); Kunihito Kondo, Nisshin (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 114 days.

(21) Appl. No.: 15/150,582

(22) Filed: May 10, 2016

(65) Prior Publication Data

US 2016/0331165 A1 Nov. 17, 2016

(30) Foreign Application Priority Data

May 12, 2015 (JP) .................................. 2015-097088

(51) Int. Cl.
*A47G 23/02* (2006.01)
*B60N 3/10* (2006.01)

(52) U.S. Cl.
CPC .................... *B60N 3/102* (2013.01)

(58) Field of Classification Search
CPC ... B60N 3/102; B60N 3/10; A61J 1/16; A47G 23/02; A47G 23/0216
USPC ................................................ 220/737, 738
See application file for complete search history.

(56) References Cited

U.S. PATENT DOCUMENTS

| | | | | |
|---|---|---|---|---|
| 4,759,584 A | * | 7/1988 | Dykstra | B60N 3/102 108/25 |
| 7,455,341 B2 | | 11/2008 | Miyashita | |
| 2004/0069792 A1 | * | 4/2004 | Schaal | B60N 3/102 220/737 |
| 2005/0269472 A1 | * | 12/2005 | Wagner | B60N 3/102 248/311.2 |
| 2013/0038097 A1 | * | 2/2013 | Oldani | B60N 3/102 297/188.14 |
| 2016/0106246 A1 | * | 4/2016 | Sawada | B60N 3/106 220/737 |

FOREIGN PATENT DOCUMENTS

| | | |
|---|---|---|
| JP | 2005-112248 A | 4/2005 |
| JP | 2007-196884 A | 8/2007 |

\* cited by examiner

*Primary Examiner* — Stephen Castellano
(74) *Attorney, Agent, or Firm* — Posz Law Group, PLC

(57) ABSTRACT

A lifting container holder includes: a case having an opening of an accommodation space; a cylindrical outer cylinder portion configured to reciprocate in an external direction of the accommodation space from the opening; an inner member portion configured to reciprocate in an internal direction to the accommodation space from the opening; and a lifting unit configured to move the inner member portion and the outer cylinder portion in different directions, the lifting unit including: an outer cylinder lifting unit including an outer cylinder link; an inner member lifting unit including a first inner member link and a second inner member link further in the internal direction of the inner member portion; and a gear unit configured to transmit swinging of the outer cylinder link and swinging of at least one of the first inner member link and the second inner member link of the inner member lifting unit.

5 Claims, 9 Drawing Sheets

LIFTING CONTAINER HOLDER

CROSS-REFERENCE TO RELATED APPLICATION(S)

This application is based upon and claims the benefit of priority from Japanese Patent Application No. 2015-097088, filed on May 12, 2015, the entire contents of which are incorporated herein by reference.

BACKGROUND

1. Field of the Invention

The present invention relates to a lifting container holder for holding a container.

2. Description of the Related Art

Beverage containers are in various shapes of having a high length to having a low length. For example, a high length container may be a PET bottle shaped container, a large-diameter paper cup, or the like, and a low length container may be a can-type container or a small paper cup. Hereinafter, as needed, the high length container is referred to as a large container and the low length container is referred to as a small container.

A general container holder has a case having an accommodation space. The accommodation space is generally defined by a side wall and a bottom wall of the case and accommodates a container. A bottom surface of the container accommodated in the accommodate space can be supported by the bottom wall of the case. A side surface of the container may be supported by the side wall of the case.

However, when a large container is accommodated in a shallow-type accommodation space for accommodating a small container, only a lower part of the large container is accommodated in the accommodation space and a upper part thereof is largely exposed upwardly to the outside of the container holder. In this case, there is a problem that it is difficult to stably support the large container in the container holder. On the other hand, when a small container is accommodated in a deep-type accommodation space for accommodating a large container, the small container falls in a lower side, that is, an inner side, of the accommodation space, there is a problem that it is difficult to take out the container. Regarding these problems, in recent years, a technology of varying a substantial depth of an accommodation space by changing a depth of a bottom wall for supporting a bottom surface of a container has been proposed.

For example, a container holding device (container holder) is disclosed in JP-A-2007-196884, which includes a fixed circumferential wall and a movable bottom wall which form at least a portion of a container accommodation space and a position adjusting mechanism for holding the movable bottom wall in a horizontal position and adjusting a position of the movable bottom wall in a vertical direction.

However, in the container holder (container holding device) of a cited JP-A-2007-196884, there is a problem that a space in a depth direction is required. That is, in order to form an accommodation space for a large container, a depth from an opening of a case of the accommodation space to a bottom wall is required to be deep and the case is needed to be large. However, for vehicles in recent years, it is required to increase interior and exterior design properties of vehicles and to reduce a space for a container holder in the vehicles. In particular, it is required to shorten a length of the container holder in a depth direction.

In addition, in the container holder (container holding device) of the cited JP-A-2007-196884, a lifting mechanism for vertically moving a bottom wall (movable bottom wall) is formed on a side of the bottom wall (movable bottom wall). A bottom wall support for connecting the bottom wall (movable bottom wall) is required in the lifting mechanism. Moreover, a slit for a vertical movement of the bottom wall support is required. A slit of a fixed circumferential wall not only deteriorates an appearance of the container holder but also causes a container to be caught therein.

In addition, in a container holder (container holding device), an opening of an accommodation space is exposed, and this may result in a poor design.

SUMMARY

The present invention is made in consideration of the circumstance and aims to provide a small container holder in a depth direction with a simple configuration.

According to an aspect of the invention, there is provided a lifting container holder including: a case which defines an accommodation space inside and has an opening of the accommodation space; a cylindrical outer cylinder portion, disposed in the accommodation space, configured to reciprocate in an external direction of the accommodation space from the opening; an inner member portion, disposed in the accommodation space and a hollow portion at a shaft center of the outer cylinder portion, configured to reciprocate in an internal direction to the accommodation space from the opening; and a lifting unit configured to move the inner member portion and the outer cylinder portion in different directions, the lifting unit including: an outer cylinder lifting unit including an outer cylinder link whose one end is connected to an end of the outer cylinder portion in the internal direction in a swingable manner; an inner member lifting unit including: a first inner member link whose one end is connected to the inner member portion in a swingable manner and the other end is connected to the case; and a second inner member link which is supported by the first inner member link in a swingable manner each other, and one end of which is connected to the case in a swingable manner and the other end of which is connected to the inner member portion, further in the internal direction of the inner member portion; and a gear unit configured to transmit swinging of the outer cylinder link and swinging of at least one of the first inner member link and the second inner member link of the inner member lifting unit.

The container holder of the present invention moves the inner member portion and the outer cylinder portion in a direction facing each other, and thereby a depth (a depth of a moving direction of the inner member portion and the outer cylinder portion) of the accommodation space for accommodating a container is changed. With this change, it is possible to form an accommodation space with a predetermined depth. That is, an accommodation space protruding from the case portion having an opening can be formed. That is, the container holder of the invention is a small container holder in a depth direction.

In addition, the container holder of the invention has the inner member lifting unit formed further inward than the inner member portion. In this configuration, each inner member link of the inner member lifting unit is covered by the inner member portion. That is, since the inner member link does not penetrate the outer cylinder portion, a slit is not needed. That is, a design property is suppressed not to be degraded due to a slit, and a container is suppressed not to be caught by the slit when the container is taken out.

Furthermore, moving of the inner member portion and the outer cylinder portion are performed by the lifting unit at the same time. That is, with this simple configuration, the inner member portion and the outer cylinder portion can be moved at the same time.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment in which a lifting container holder of the present invention is embodied in a cup holder will be described in detail referring to drawings.

Moreover, each of a upward direction and a downward direction represents a direction upward or downward in each drawing unless not particularly mentioned. More specifically, "upward" corresponds to a direction (shaft direction) from the opening to the outside of the accommodation space. "Downward" corresponds to a direction (shaft direction) from the opening to the inside of the accommodation space.

A cup holder 1 of the present embodiment is a drink holder installed in a console box of a vehicle.

A configuration of the cup holder 1 is shown in FIGS. 1 to 10.

Figure 1:
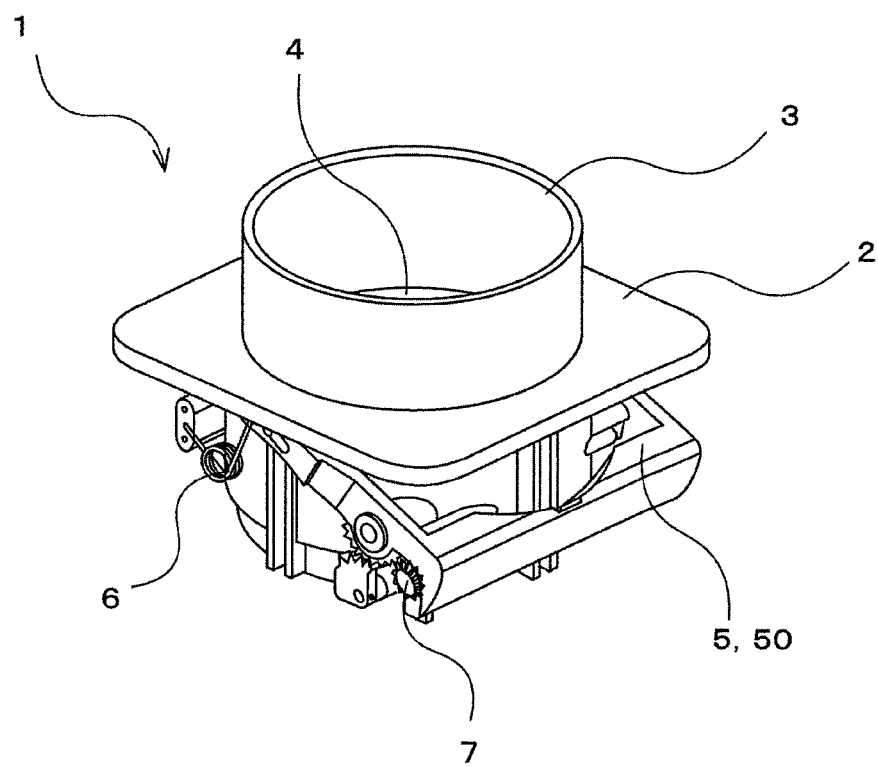
FIG. 1 is a perspective view of a cup holder in a state of use according to an embodiment.

As shown in FIG. 1, the cup holder 1 has a main body 2, an outer cylinder 3, an inner member 4, a lifting unit 5, and a spring 6.

Figure 2:
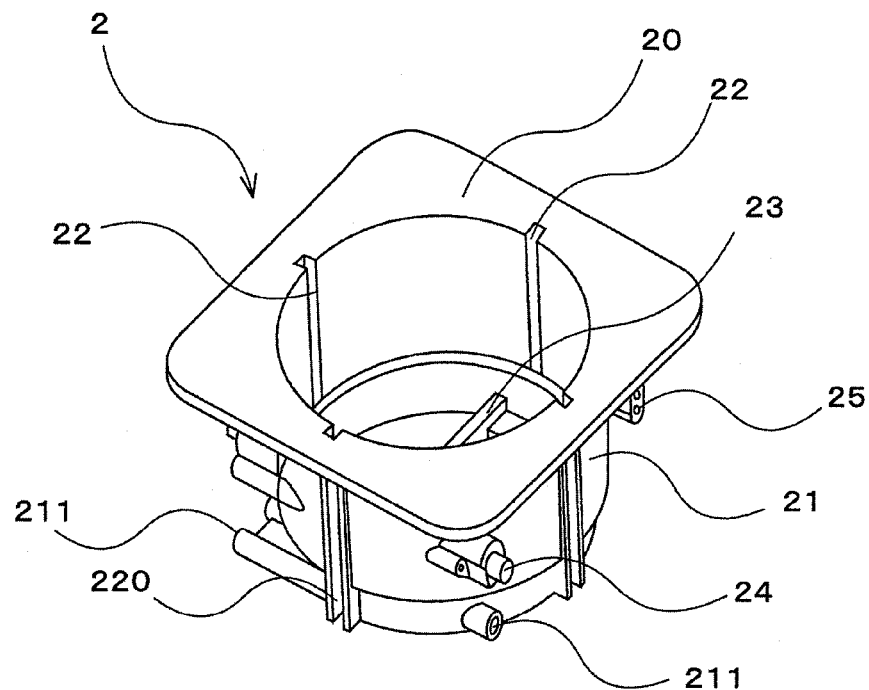
FIG. 2 is a perspective view of a main body of the cup holder according to the embodiment.

The main body 2 has an upper surface 20 and a cylinder 21 as shown in a perspective view of FIG. 2. The main body 2 has an opening which corresponds to a case portion, and defines an accommodation space therein and defines a communication hole for communicating the accommodation space with the outside.

The upper surface 20 is a plate-shaped member which forms an upper surface of the cup holder 1. The upper surface 20 is connected to an end (a top in a drawing) of one side of the cylinder 21 and has an opening for communicating with a hollow space at a shaft center of the cylinder 21.

The cylinder 21 is a tube-shaped member which defines an accommodation space in the cup holder 1. The accommodation space accommodates the outer cylinder 3 and the inner member 4, and is a space for forming a portion of a space accommodating a cup (drink, container). An end of one side of the cylinder 21 is connected to the upper surface 20. A tube-shaped member forming the cylinder 21 may be in a shape of forming an accommodation space, a cylindrical member as shown in a drawing, or a square cylindrical member.

The cylinder 21 has a notch 22 therein, which extends from one end (bottom side) of the other side to an end of one side. The notch 22 is penetrated by an outer cylinder protrusion 31 when the outer cylinder 3 is assembled. A circumferential edge of the cylinder 21 in which the notch 22 is formed has a flange 220 which protrudes from the outer circumferential surface and extends (toward the outside in a radial direction).

Figure 11:
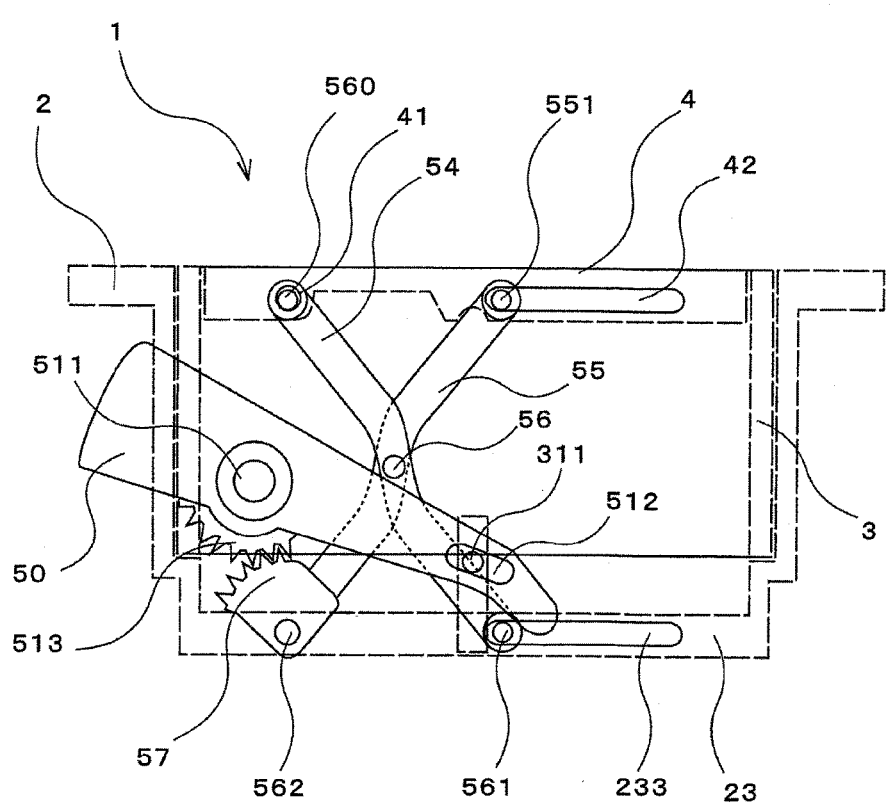
FIG. 11 is a configuration diagram of the cup holder in a state of use according to the embodiment.
Figure 12:
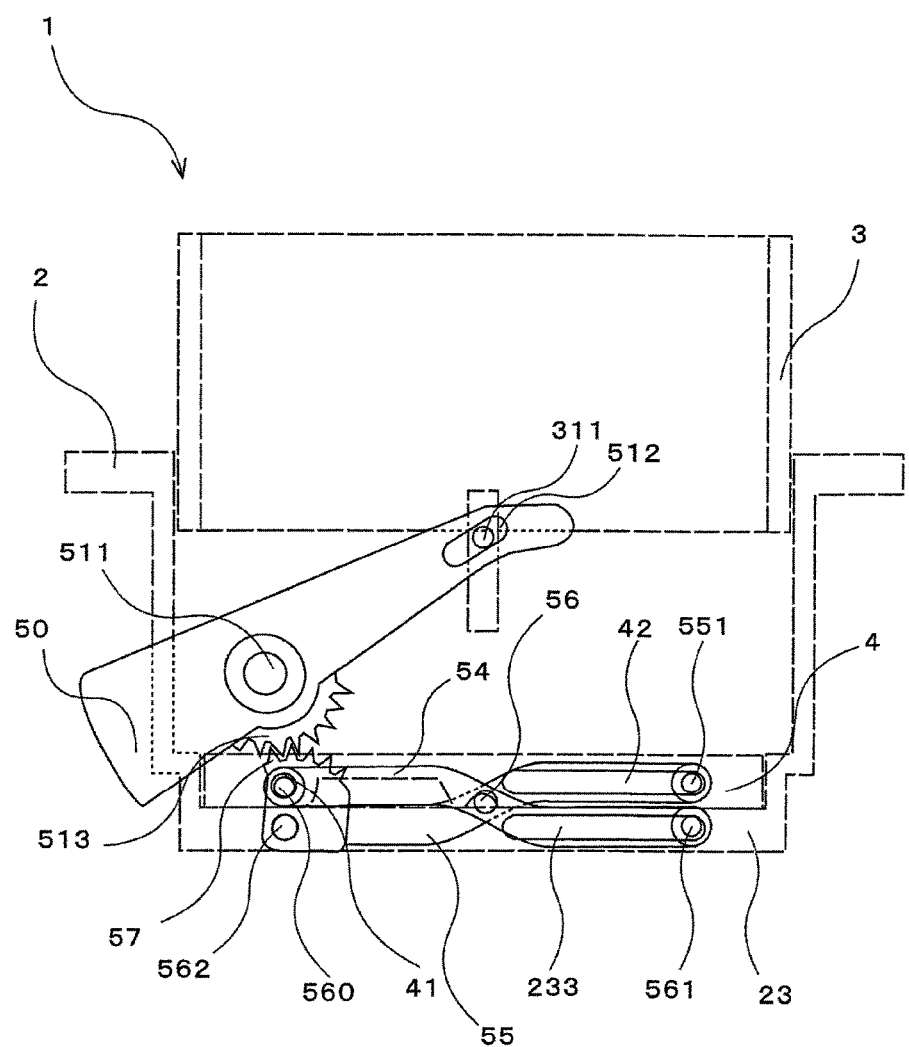
FIG. 12 is a configuration diagram of the cup holder in a storage state according to the embodiment.

The cylinder 21 of the embodiment has a diameter smaller than that of an opening in a range of a predetermined length from an end (bottom) of the other side as shown in FIGS. 11 to 12. In particular, the cylinder 21 has a stair-shaped stepped portion whose inner diameter is changed. This stepped portion matches with a bottom of the outer cylinder 3, thereby preventing the outer cylinder 3 from excessively moving downward.

The cylinder 21 has two through holes 211 formed on an end (bottom) of the other side. Two through holes 211 and 211 are formed at a coaxial position. Two through holes 211 and 211 are formed at a position having one end of a second inner member link 55 disposed in between when an inner member lifting unit 53 is disposed in the hollow portion at the shaft center of the cylinder 21.

The cylinder 21 has a belt-shaped lower surface 23 extending along an end surface at the end (bottom) of the other side. The lower surface 23 is formed so as to cross through the shaft center of the end (bottom) of the other side. A width of the lower surface 23 is formed to be narrower than an inner diameter of the cylinder 21, a side of the belt-shaped lower surface 23 is not blocked, and the inside of the cylinder 21 communicate with the outside thereof.

Figure 3:
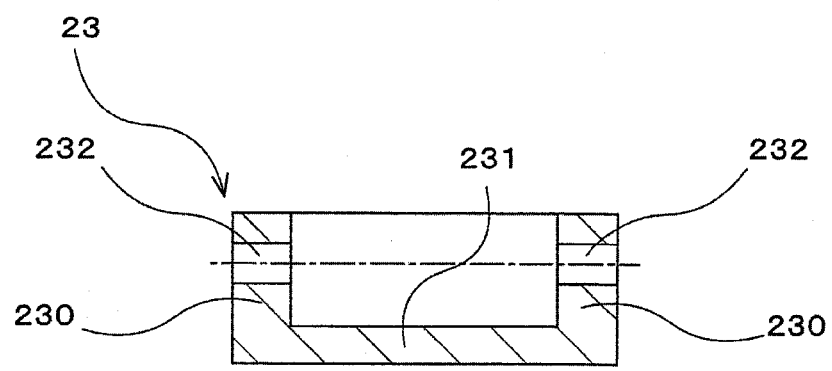
FIG. 3 is a cross-sectional view which shows a configuration of a lower surface of the main body of the cup holder of the embodiment.

The lower surface 23 has a concave shape in which both ends protrude upward in a cross-section perpendicular to an extending direction thereof, as shown in a cross-sectional view of FIG. 3. Specifically, the lower surface 23 has a pair of vertical walls 230 and 230, and a bottom wall 231 connecting the pair of vertical walls 230 and 230.

In the cross-section of a concave shape of the lower surface 23, a width between the pair of vertical walls 230 and 230 is formed to be wider than widths of a first inner member link 54 and the second inner member link 55. That is, it is possible to dispose an inner member lifting unit 53 in the inside of a concave shape.

Figure 4:
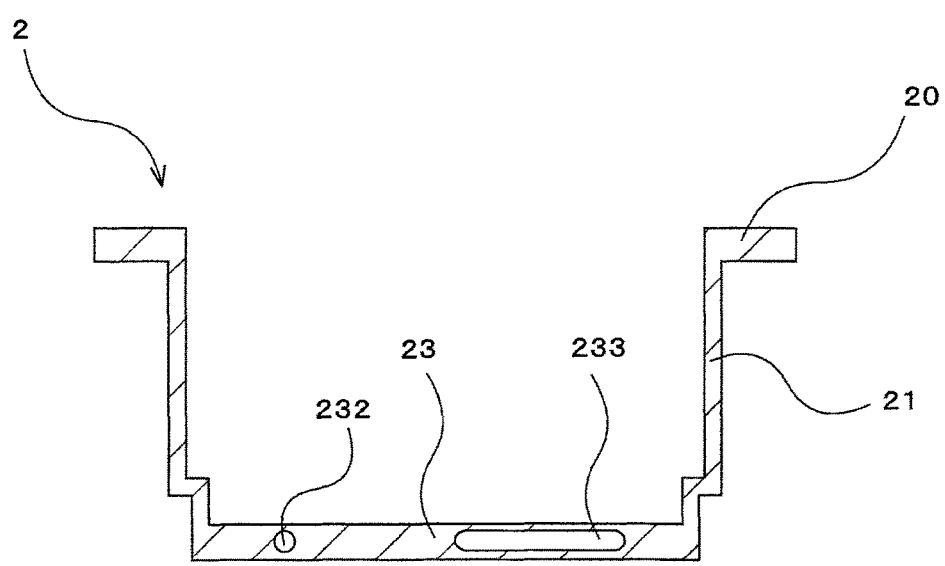
FIG. 4 is a view which schematically shows a configuration of the main body of the cup holder according to the embodiment.

The lower surface 23 has through holes 232 and 232 formed on each of the pair of vertical walls 230 and 230 as shown in FIGS. 3 and 4. The through holes 232 and 232 are not only coaxially formed but also coaxially formed with a through hole 211 of the main body 2. Moreover, FIG. 4 is a cross-sectional view which schematically shows a configuration of the lower surface 23 from a side.

In addition, a through hole 233 is formed on each of the pair of vertical walls 230 and 230. The through hole 233 has a groove shape extending in an extending direction of the belt-shaped lower surface 23. Each of the through holes 233 and 233 may be coaxially formed.

The cylinder 21 has a link support protrusion 24 which supports an outer cylinder link 51 of the lifting unit 5 to be rotatable (swingable) about a rotation center 511 on the outer circumferential surface. The link support protrusion 24 is a stick-shaped (columnar) protrusion protruding from the outer circumferential surface of the cylinder 21.

Moreover, the cylinder 21 has a spring engaged protrusion 25 which is engaged with one end of a spring 6 on the outer circumferential surface. The other end of the spring 6 is engaged with an end of one side of the outer cylinder link 51.

The outer cylinder 3 is a cylindrical member which corresponds to an outer cylinder portion, is disposed in an accommodation space, and reciprocates in a direction from an opening to the outside of the accommodation space.

Figure 5:
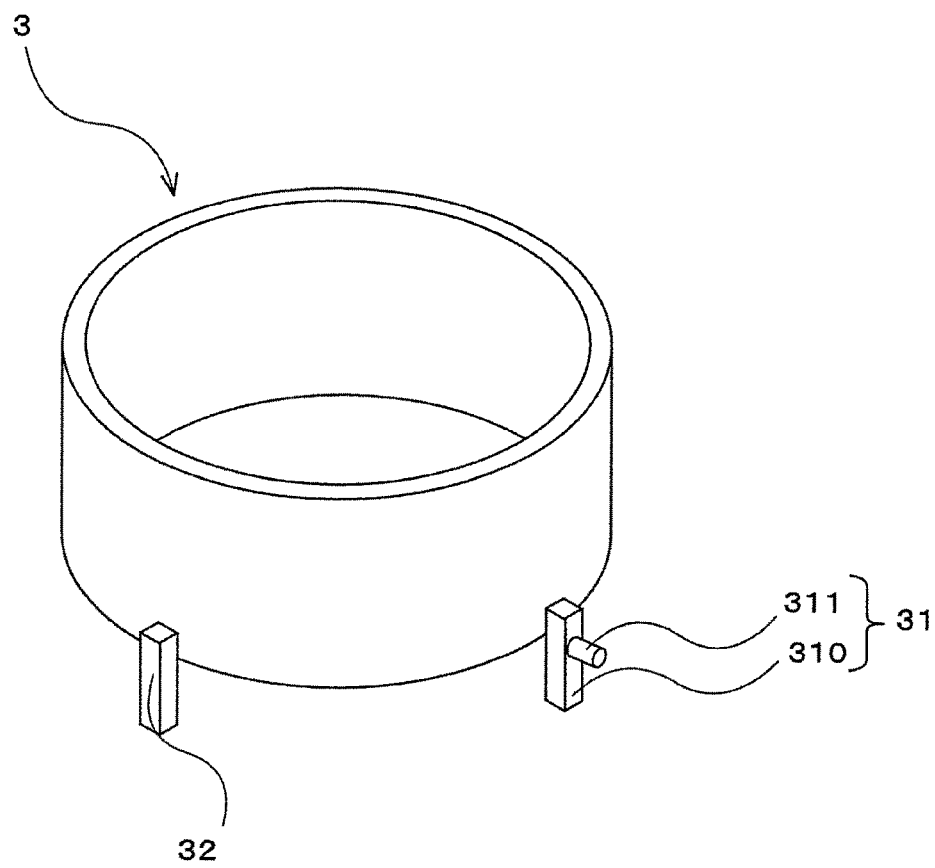
FIG. 5 is a perspective view of an outer cylinder of the cup holder according to the embodiment.

The outer cylinder 3 is a member having a cylindrical shape (cylindrical member) accommodated in the accommodation space of the main body 2 as shown in a perspective view of FIG. 5. The outer cylinder 3 does not have an unevenness such as a notch on the inner circumferential surface. The outer cylinder 3 has a cylindrical shape with an outer periphery shape appropriately matched with a shape of a hollow portion at the shaft center of the cylinder 21. A length of the outer cylinder 3 in a shaft direction may be a length which can be accommodated in the accommodation space, the length is preferably long, and the length is more preferably the same as a length of the cylinder 21.

The outer cylinder 3 has outer cylinder protrusions 31 and 32 on the outer circumferential surface. In the embodiment, two of the outer cylinder protrusion 31 and the outer cylinder protrusion 32 are formed, respectively. The outer cylinder protrusion 31 and the outer cylinder protrusion 32 are alternately formed in a main direction.

The outer cylinder protrusion 31 includes an outer cylinder protrusion main body 310 which is a protrusion protruding from the outer circumferential surface of the outer cylinder 3, is inserted to the notch 22 of the cylinder 21, and guides the outer cylinder 3 along the notch 22 and the flange 220, and a cylindrical outer cylinder protrusion tip 311 which protrudes from the outer circumferential surface of the outer cylinder protrusion main body 310 in contact with the outside in a radial direction.

The outer cylinder protrusion main body 310 is formed on an outer circumferential surface at the bottom of the outer cylinder 3 and has a substantially square cylindrical shape extending to a lower side. The substantially square cylindrical shape of the outer cylinder protrusion main body 310 is formed in a size which can be inserted in the notch 22 (and the flange 220).

The outer cylinder protrusion tip 311 is connected with the outer cylinder link 51 of the lifting unit 5.

The outer cylinder protrusion 32 is a protrusion protruding from the outer circumferential surface of the outer cylinder 3, is inserted in the notch 22 of the cylinder 21, and guides the outer cylinder 3 along the notch 22 and the flange 220.

The outer cylinder protrusion 32 is formed on the outer circumferential surface at the bottom of the outer cylinder 3 and has a substantially square cylindrical shape extending to the lower side, similarly to the outer cylinder protrusion main body 310. The substantially square cylindrical shape of the outer cylinder protrusion 32 is formed in a size which can be inserted in the notch 22 (and the flange 220).

The inner member 4 is a member which corresponds to an inner member portion, is disposed in an accommodation space that is a hollow portion at the shaft center of the outer cylinder 3, and reciprocates in a direction from the opening to the inside of the accommodation space. The inner member 4 is a member accommodated in the accommodation space of the main body 2 and the hollow portion at the shaft center of the outer cylinder 3 as shown in FIG. 1.

Figure 6:
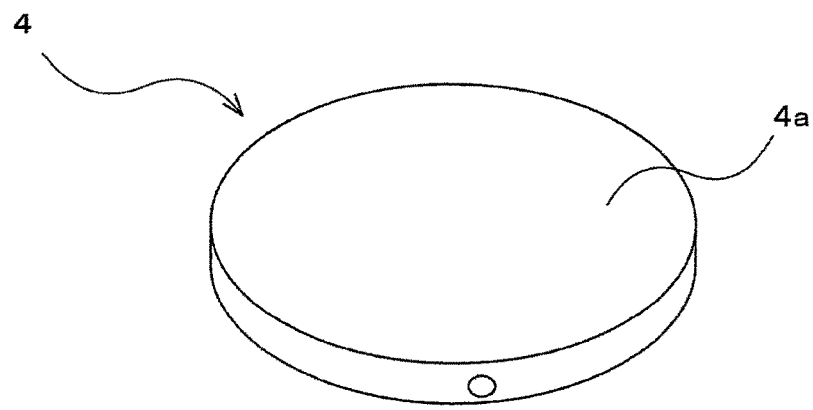
FIG. 6 is a perspective view of an inner member of the cup holder according to the embodiment.

The inner member 4 is a substantially disk-shaped member which has an outer circumferential shape substantially matched with a shape of the hollow portion at the shaft center of the outer cylinder 3 as shown in a perspective view of FIG. 6.

An upper surface 4a of the inner member 4 forms a design surface on a top surface of a cup holder 1 (serves as a lid member), and serves as a bottom wall which holds (supports) a bottom surface of a cup (drink, container) when the cup holder 1 holds the cup (drink, container). That is, the inner member 4 can place a cup (drink, container) on the top.

Figure 7:
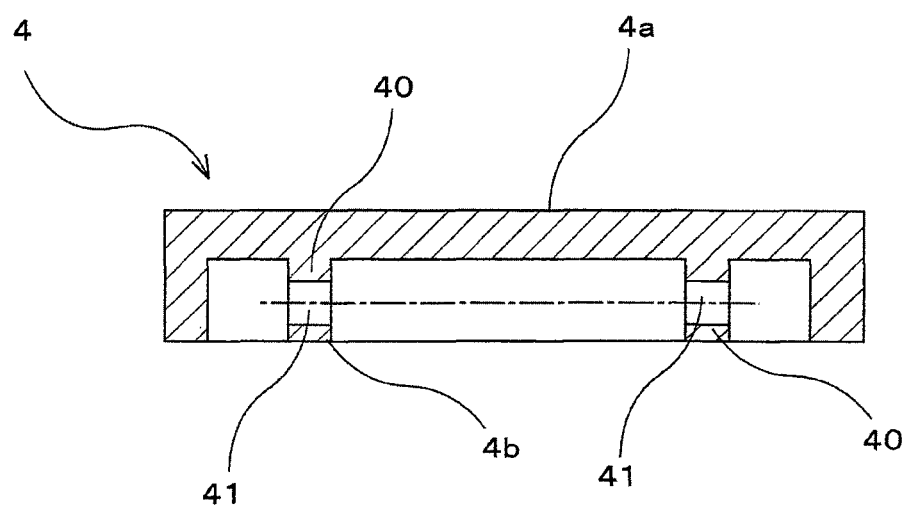
FIG. 7 is a cross-sectional view which shows a configuration of the inner member of the cup holder according to the embodiment.
Figure 8:
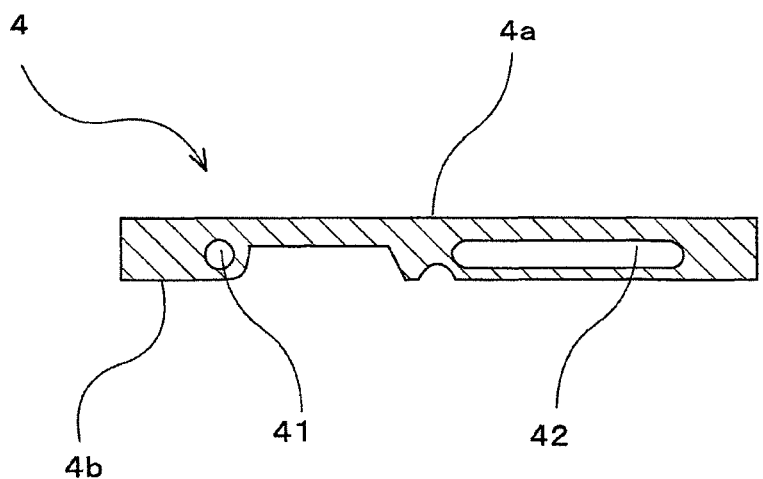
FIG. 8 is a view which schematically shows the configuration of the inner member of the cup holder according to the embodiment.

A pair of vertical walls 40 and 40 with the through holes 41 and 41 opened on a lower surface 4b are formed in the inner member 4 as shown in FIGS. 7 and 8. In addition, FIG. 7, similarly to FIG. 3, and FIG. 8, similarly to FIG. 4, are views which show a configuration of the inner member 4.

The width between the pair of vertical walls 40 and 40 is formed to be wider than the widths of the first inner member link 54 and the second inner member link 55. That is, the inner member lifting unit 53 can be disposed in a space between the pair of vertical walls 40 and 40.

The through holes 41 and 41 are formed in the pair of vertical walls 40 and 40, respectively. The through holes 41 and 41 are coaxially formed.

Moreover, the through hole 42 is formed in each of the pair of vertical walls 40 and 40. The through hole 42 has a groove shape extending in an extending direction of the vertical wall 40. The through holes 42 and 42 are coaxially formed, respectively.

The inner member 4 is assembled so that the extending direction of the pair of vertical walls 40 and 40 is overlapped with the lower surface 23 of the main body 2.

The lifting unit 5 corresponds to a lifting unit and moves the inner member 4 and the outer cylinder 3 in different directions.

Figure 9:
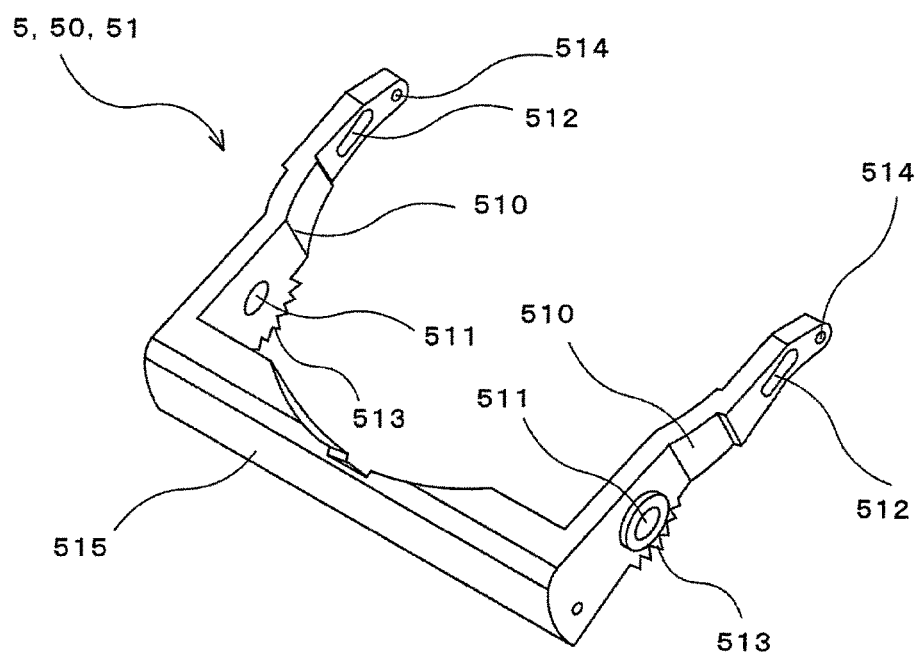
FIG. 9 is an exploded view which shows a configuration of an outer cylinder lifting unit of the cup holder according to the embodiment.
Figure 10:
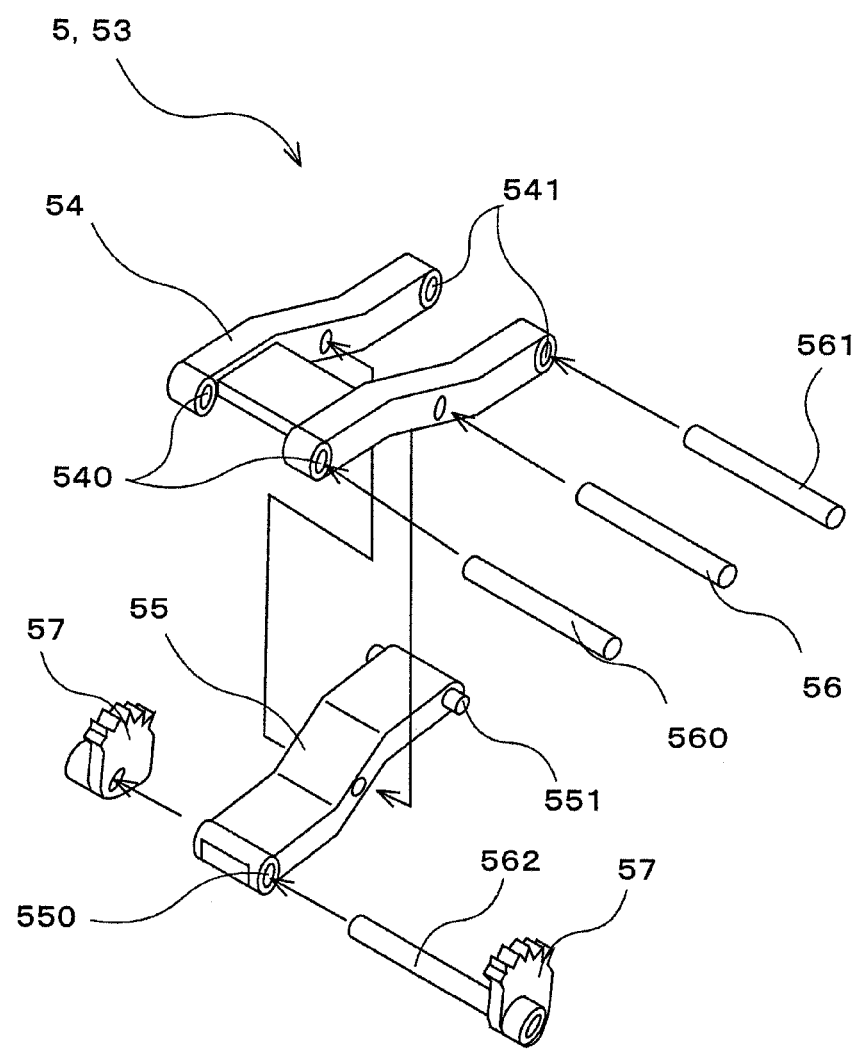
FIG. 10 is an exploded view which shows a configuration of an inner member lifting unit of the cup holder according to the embodiment.

The lifting unit 5 includes an outer cylinder lifting unit 50 having the outer cylinder link 51 as shown in FIG. 9, and the inner member lifting unit 53 having the first inner member link 54 and the second inner member link 55 as shown in FIG. 10.

The outer cylinder lifting unit 50 has the outer cylinder link 51. The outer cylinder link 51 has a pair of rotating portions 510 and 510 and a connecting portion 515 for connecting the pair of rotating portions 510 and 510.

The rotating portion 510 has a substantial stick-shape (substantial plate-shape), and has the rotation center 511 between the tip and the base end. The rotating portion 510 has a hole 512 in which the outer cylinder protrusion tip 311 of the outer cylinder 3 is inserted. The hole 512 has a shape extending in a length direction of the rotating portion 510. The hole 512 has this shape (groove shape), thereby allowing the outer cylinder protrusion tip 311 to reciprocate in a vertical direction (shaft direction).

Moreover, the rotating portion 510 has a hole 514 engaged with the spring 6 opened on a further tip side than the hole 512.

The rotating portion 510 has an outer cylinder gear unit 513 coaxially formed with the rotation center 511 between the tip and the base end. The outer cylinder gear unit 513 is a substantially arc-shaped portion which is formed on a plate-shaped side surface (side surface of a lower side in a drawing) of the rotating portion 510 and in which a gear (gear) is formed on the outer circumferential surface. The substantially arc-shaped outer circumferential surface on which a gear of the outer cylinder gear unit 513 is formed is an arc-shaped surface centered about the rotation center 511.

The connecting portion 515 connects the pair of rotating portions 510 and 510 to each of the base ends. The connecting portion 515 performs the connection of the pair of rotating portions 510 and 510 with respective rotation centers 511 and 511 coaxially positioned. The connecting portion 515 performs the connection of the pair of rotating portions 510 and 510, and thereby the pair of rotating portions 510 and 510 can rotate about the rotation center 511.

The outer cylinder lifting unit 50 is assembled with the outer cylinder protrusion tips 311 and 311 protruding in a direction of facing each other in a position of 180° inserted in respective holes 512 and 512 of the pair of rotating portions 510 and 510. At this time, the pair of rotating portions 510 and 510 are disposed and connected in a state of extending in an annular tangential direction of the main body 2 (outer cylinder 3). The outer cylinder lifting unit 50 is assembled with the main body 2 positioned between the pair of rotating portions 510 and 510.

The inner member lifting unit 53 has the first inner member link 54 and the second inner member link 55 as shown in an exploded view of FIG. 10.

One end of the first inner member link 54 is coaxially connected to the through hole 41 of the inner member 4 in a swingable manner (in a rotatable manner), and the other end is connected to the through hole 233 of the lower surface 23 of the main body 2. The first inner member link 54 has a plate shape of a substantially U-shape whose the other end side is opened. A through hole 540 penetrating in a width direction of the plate is formed at an end of the first inner member link 54. Moreover, through holes 541 and 541 penetrating in the width direction of the plate are formed at the other end of the first inner member link 54.

The first inner member link 54 is assembled in the inner member 4 by causing a shaft 560 to penetrate the through hole 540 at one end and the through holes 41 and 41 of a lower surface 4b of the inner member 4. At this time, the first inner member link 54 is disposed between the pair of vertical walls 40 and 40. That is, the shaft 560 sequentially penetrates the through hole 41, the through hole 540, and the through hole 41. In addition, the first inner member link 54 is assembled so as to be rotatable (swingable) about the shaft 560.

The first inner member link 54 is connected so as to be rotatable (swingable) about the shaft 561 by causing a shaft 561 to penetrate the through hole 541 at the other end and the through hole 233 opened in the main body 2. At this time, the shaft 561 sequentially penetrates the through hole 233, the through hole 541, the through hole 541, and the through hole 233.

The shaft 561 is connected so as to be movable along the through hole 233.

One end of the second inner member link 55 is coaxially connected to the through hole 232 of the main body 2 in a swingable (rotatable) manner, and the other end is connected to the through hole 42 of the inner member 4. The second inner member link 55 has a substantially belt-shape (a substantially belt-shape narrower than an opening of the first inner member link 54) with a width which can be inserted in a substantially U-shape opening of the first inner member link 54. A through hole 550 penetrating in a width direction of the plate is formed on one end of the second inner member link 55. Moreover, a protrusion 551 protruding from a side surface of the plate in the width direction is formed on the other end of the second inner member link 55.

The second inner member link 55 is swingably (rotatably) connected to the main body 2 by causing a shaft 562 to penetrate the through hole 550 at one end and the through hole 232 of the main body 2. The shaft 562 is assembled to penetrate even the through holes 211 and 211 of the main body 2. That is, the shaft 562 sequentially penetrates the through hole 211, the through hole 232, the though hole 550, the through hole 232, and the through hole 211.

The second inner member link 55 is connected so as to be swingable (rotatable) about the protrusion 551 by causing the protrusion 551 at the other end to be inserted (to penetrate) in the through hole 42 of the inner member 4. Moreover, the protrusion 551 is connected so as to be movable along the through hole 42.

The shaft 562 which connects the second inner member link 55 to the main body 2 rotates in accordance with swinging of the second inner member link 55. Then, the shaft 562 has a gear 57 engaged with the outer cylinder gear unit 513. The outer cylinder gear unit 513 is engaged with the gear 57, and thereby the second inner member link 55 and the outer cylinder link 51 operate in conjunction with each other. The gear 57 corresponds to an inner member gear unit.

The first inner member link 54 and the second inner member link 55, in an extending direction, are formed by being bent in a substantially crank shape of different directions.

The first inner member link 54 and the second inner member link 55 are assembled with the second inner member link 55 positioned between the first inner member links 54. The shaft 56 penetrates both of the links 54 and 55 between one end and the other end (center). At this time, the first inner member link 54 and the second inner member link 55 are assembled so as to be swingable each other about the shaft 56.

The spring 6 is corresponds to a bias unit. The spring 6 is made of a turn over spring in which one end is engaged with a spring engaged protrusion 25 of the cylinder 21 and the other end is engaged with an end of one side of the outer cylinder link 51. The spring 6 biases the outer cylinder 3 in an external direction or an internal direction of the accommodation space.

The turn over spring of the spring 6 biases the outer cylinder 3 in the external direction or the internal direction of the accommodation space through the outer cylinder link 51. The turn over spring switches a biasing direction between the external direction and the internal direction. The switch of the biasing direction by the turn over spring is generated when the outer cylinder link 51 operates and when a distance between one end and the other end is shortened and a position having a shortest distance is passed.

The cup holder 1 of the embodiment further has a damper 7. The damper 7 has a gear engaged with the outer cylinder gear unit 513 and the gear 57 and controls (rate-limit) a rotation speed of the outer cylinder gear unit 513 and the gear 57.

The cup holder 1 of the embodiment is disposed so that the outer cylinder 3 is accommodated in the accommodation space and the upper surface 4a of the inner member 4 and an upper end (cross-section) of the outer cylinder 3 form a plane with the upper surface 20 of the main body 2. This state is a state in which it is not possible to accommodate a cup (drink), and is set to be a storage state.

Moreover, by pressing down the upper surface 4a of the inner member 4, the inner member 4 moves so as to be pushed in the accommodation space, and the outer cylinder 3 moves so as to be pushed up. A state in which the outer cylinder 3 moves to be a uppermost end side and the inner member 4 moves to be a lowermost end side is a state of accommodating a cup (drink), and is set to be a state of use.

A configuration of the cup holder 1 of the embodiment in a storage state is shown in a schematic configuration view of FIG. 11.

In the storage state, the outer cylinder 3 is accommodated in the accommodation space. In this state, the outer cylinder 3 is positioned at a lowermost side. The outer cylinder protrusions 31 and 32 formed at an end of a lower side of the outer cylinder 3 are positioned at the lowermost side. The outer cylinder protrusion tip 311 of the outer cylinder protrusion 31 is inserted in the hole 512 of the outer cylinder link 51 of the outer cylinder lifting unit 50. For this reason, a tip of the rotating portion 510 of the outer cylinder link 51 is positioned at a lower side (going down). At this time, the tip of the rotating portion 510 is positioned at a further lower side than the rotation center 511. As shown in FIG. 11, the inner member 4 is accommodated in the accommodation space in the storage state. In this state, the inner member 4 is positioned on the uppermost side.

The inner member lifting unit 53 is connected to the lower surface 4b of the inner member 4. At this time, a first inner member link 54 and a second inner member link 55 which configure the inner member lifting unit 53 are connected to each other at the shaft 56 to form a X shape.

The first inner member link 54 is coaxially connected to the inner member 4 in a swingable (rotatable) manner by causing the shaft 560 to penetrate the through hole 540 at one end and the through hole 41 on the lower surface 4b of the inner member 4. The connection is also provided by causing the shaft 561 to penetrate the through hole 541 at the other end and the through hole 233 opened in the main body 2. At this time, both ends of the shafts 560 and 561 protrude from openings of the through hole 41 and the through hole 233. The other end of the first inner member link 54 is disposed to be movable in an extending direction of the through hole 233. The first inner member link 54 in the storage state is in a most standing state (a state of having a smallest inclination angle with respect to a shaft direction).

The second inner member link 55 is coaxially connected to the main body 2 in a swingable (rotatable) manner by causing the shaft 562 to penetrate the through hole 550 at one end and the through hole 232 of the main body 2. The connection is also provided by inserting the protrusion 551 at the other end in the through hole 42 opened in the inner member 4. At this time, both ends of the shaft 562 and the protrusion 551 protrude from openings of the through hole 232 and the through hole 42. The other end of the second inner member link 55 is disposed to be movable in an extending direction (an extending direction of the vertical wall 40) of the through hole 42. The second inner member link 55 in the storage state, similarly to the first inner member link 54, is in a most standing state (a state of having a smallest inclination angle with respect to a shaft direction).

At this time, a distance between one end of the first inner member link 54 and the other end of the second inner member link 55 becomes the shortest. Similarly, a distance between the other end of the first inner member link 54 and one end of the second inner member link 55 becomes the shortest. These distances can be set to be a distance between the shaft 560 and the protrusion 551 and a distance between the shafts 561 and 562, respectively.

The gear 57 of the shaft 562 for connecting the second inner member link 55 to the main body 2 is engaged with the outer cylinder gear unit 513.

In the storage state, the spring 6 biases the tip of the rotating portion 510 of the outer cylinder link 51 downward. That is, the outer cylinder 3 is biased downward through the outer cylinder link 51. Moreover, a free rotation of the outer cylinder link 51 is regulated by the spring 6. The inner member 4 is biased upward by the inner member lifting unit 53 (the second inner member link 55 and the first inner member link 54) through the outer cylinder gear unit 513.

The cup holder 1 in the storage state can be in the state of use by compressing and pressing down the upper surface 4a of the inner member 4.

When the upper surface 4a of the inner member 4 is compressed and pressed down, the inner member 4 moves downward. At this time, a force for pressing the upper surface 4a of the inner member 4 is larger than a force for biasing, by the spring 6, the tip of the rotating portion 510 of the outer cylinder link 51 downward.

When the upper surface 4a of the inner member 4 is compressed using the force, the inner member 4 moves downward. When the inner member 4 moves downward, the second inner member link 55 is inclined in a direction (a lying direction of the second inner member link 55) in which the inclination angle with respect to the shaft direction is increased. One end of the second inner member link 55 is inclined so as to rotate about a swinging center. At this time, the other end of the second inner member link 55 moves in a direction of being separated from one end of the first inner member link 54. Moreover, the protrusion 551 at the other end of the second inner member link 55 moves along the groove-shaped through hole 42 of the inner member 4.

In the same manner, when the inner member 4 moves downward, the first inner member link 54 is inclined in a direction in which the inclination angle with respect to the shaft direction is increased. One end of the first inner member link 54 is inclined so as to rotate about the swinging center. The other end of the first inner member link 54 moves in a direction of being separated from one end of the second inner member link 55. Moreover, the shaft 561 at the other end of the first inner member link 54 moves along the groove-shaped through hole 233 of the main body 2.

In other words, when the inner member 4 moves downward, the X shape formed by two inner member links 54 and 55 of the inner member lifting unit 53 is reduced in height and increased in width.

That is, a distance between one end of the first inner member link 54 and the other end of the second inner member link 55 is widened. In the same manner, a distance between the other end of the first inner member link 54 and one end of the second inner member link 55 is widened. A change in the distances is caused by the through hole 233 and the through hole 42 formed in a groove shape.

Swinging (rotation) of the second inner member link 55 is transmitted to the outer cylinder link 51 through the gear 57 and the outer cylinder gear unit 513. The outer cylinder link 51 can push up the tip upward through the outer cylinder gear unit 513. Then, the hole 512 opened in the rotating portion 510 is pushed up and the outer cylinder protrusion tip 311 inserted in the hole 512 is also pushed up. As a result, the outer cylinder 3 is pushed up.

When the inner member 4 moves downward and the outer cylinder link 51 is rotated, the spring 6 is compressed. When the spring 6 is compressed, a direction of a bias force of the turn over spring is reversed. Then, the tip of the rotating portion 510 of the outer cylinder link 51 is pushed upward. The hole 512 opened in the rotating portion 510 is pushed up and the outer cylinder protrusion tip 311 inserted in the hole 512 is also pushed up. As a result, the outer cylinder 3 is pushed up to the uppermost side and is biased.

When the direction of a bias force of the spring 6 is reversed, the second inner member link 55 is rotated through the outer cylinder gear unit 513 and the gear 57 (shaft 563). A rotation of the second inner member link 55 causes two inner member links 54 and 55 of the inner member lifting unit 53 to swing (rotate) in a direction in which the X shape is reduced in height and increased in width. Further, two inner member links 54 and 55 become in a state (state of use) of extending in a direction perpendicular to the shaft direction.

Moreover, after the direction of a bias force of the spring 6 is reversed, a rotation speed of the outer cylinder gear unit 513 and the gear 57 is controlled (rate-limited) by the damper 7.

A configuration of the cup holder 1 of the embodiment in the state of use is shown in a schematic configuration view of FIG. 12.

As shown in FIG. 12, in the state of use, the outer cylinder 3 protrudes from the accommodation space (the upper surface 20 of the main body 2) of the outer cylinder 3. In this state, the outer cylinder 3 is positioned at the uppermost side. The outer cylinder protrusions 31 and 32 formed at an end of a lower side of the outer cylinder 3 are also positioned at an end of the upper side. The outer cylinder protrusion tip 311 of the outer cylinder protrusion 31 is inserted in the hole 512 of the outer cylinder link 51 of the outer cylinder lifting unit 50. For this reason, the tip of the rotating portion 510 of the outer cylinder link 51 is positioned upward (going up). At this time, the tip of the rotating portion 510 is positioned further upward than the rotation center 511. In the state of use, the inner member 4 moves in the internal direction in the accommodation space. In this state, the inner member 4 is positioned at the lowermost side.

The first inner member link 54 in the state of use becomes in a lowest-lying state (a state of having a largest inclination angle with respect to the shaft direction, 90 degrees in a drawing). In the same manner, the second inner member link 55 is in a lowest-lying state (a state of having a largest inclination angle with respect to the shaft direction, 90 degrees in a drawing).

At this time, the distance between one end of the first inner member link 54 and the other end of the second inner member link 55 is the longest. In the same manner, the distance between the other end of the first inner member link 54 and one end of the second inner member link 55 is the longest.

In the state of use, the spring 6 biases the tip of the rotating portion 510 of the outer cylinder link 51 upward. That is, the outer cylinder 3 is biased upward through the outer cylinder link 51. In addition, the free rotation of the outer cylinder link 51 is regulated by the spring 6. The inner member 4 is biased downward by the inner member lifting unit 53 (the second inner member link 55 and the first inner member link 54) through the outer cylinder gear unit 513.

The cup holder 1 in the state of use can be in the storage state by compressing and pressing down the outer cylinder 3.

When the outer cylinder 3 is compressed and pressed down, the outer cylinder link 51 is rotated and the inner member 4 moves upward. Then, the spring 6 is compressed and the direction of the bias force of the turn over spring is reversed.

Afterward, the outer cylinder 3 is pressed down and is in the storage state at the same time due to an application of a bias force in a direction of moving the inner member 4 upward.

As described above, the cup holder 1 of the embodiment can be moved with a simple configuration by the outer cylinder 3 and the inner member 4 being connected to both ends of the lifting unit 5, respectively, and being associated with each other in different directions.

Then, the outer cylinder 3 and the inner member 4 move in different directions and the outer cylinder 3 is caused to protrude from the upper surface 20, and thereby it is possible to increase a length of a formed cup accommodation space in the shaft direction. That is, the cup holder 1 of the embodiment can stably hold a long cup (or PET bottle) in the shaft direction.

Moreover, the cup holder 1 of the embodiment has the inner member lifting unit 53 moving the inner member 4 formed at the lower side of the inner member 4. For this reason, the outer cylinder 3 does not have a cutout. As a result, degradation of design properties of the accommodation space for accommodating a cup (drink) is suppressed.

Moreover, an unevenness is not formed on an inner circumferential surface of the outer cylinder 3, and thereby, when a cup (drink) is inserted, suppressing the cup not to be caught and suppressing a content of the cup not to overflow.

What is claimed is:

1. A lifting container holder comprising:
    a case which defines an accommodation space inside and has an opening of the accommodation space;
    a cylindrical outer cylinder portion, disposed in the accommodation space, configured to reciprocate in an external direction of the accommodation space from the opening;
    an inner member portion, disposed in the accommodation space and a hollow portion at a shaft center of the outer cylinder portion, configured to reciprocate in an internal direction to the accommodation space from the opening; and
    a lifting unit configured to move the inner member portion and the outer cylinder portion in different directions, the lifting unit including:
        an outer cylinder lifting unit including an outer cylinder link whose one end is connected to an end of the outer cylinder portion in the internal direction in a swingable manner;
        an inner member lifting unit including: a first inner member link whose one end is connected to the inner member portion in a swingable manner and the other end is connected to the case; and a second inner member link which is supported by the first inner member link in a swingable manner each other, and one end of which is connected to the case in a swingable manner and the other end of which is connected to the inner member portion, further in the internal direction of the inner member portion; and
        a gear unit configured to transmit swinging of the outer cylinder link and swinging of at least one of the first inner member link and the second inner member link of the inner member lifting unit.

2. The lifting container holder according to claim 1, wherein the other end of the first inner member link is connected to the other end of the second inner member link in a state in which a distance between one end of the first inner member link and the other end of the second inner member link and a distance between one end of the second inner member link and the other end of the first inner member link are allowed to vary.

3. The lifting container holder according to claim 1, wherein the gear unit includes: an outer cylinder gear unit which includes a rotation center matched with a swinging center of the outer cylinder link in the outer cylinder link; and an inner member gear unit which includes a rotation center matched with a swinging center of the second inner member link in the second inner member link and is engaged with the outer cylinder gear unit.

4. The lifting container holder according to claim 1, wherein the lifting unit has a biasing unit configured to bias one of the outer cylinder portion and the inner member portion in the external direction or the internal direction of the accommodation space, or a biasing direction of which is reversed in the external direction and the internal direction.

5. The lifting container holder according to claim 1, wherein the inner member portion has an upper surface which is a bottom wall on which a container is placed.

* * * * *